United States Patent
Arnold

[15] 3,704,033
[45] Nov. 28, 1972

[54] CONNECTOR FOR TUBULAR MEMBERS

[72] Inventor: James F. Arnold, Baytown, Tex.

[73] Assignee: Hydro Tech Services, Inc., Houston, Tex.

[22] Filed: Jan. 15, 1971

[21] Appl. No.: 106,854

[52] U.S. Cl. .....................285/18, 166/0.6, 285/322, 285/342, 285/348, 285/DIG. 21
[51] Int. Cl.............................................F16l 35/00
[58] Field of Search......285/18, 24, 27, 94, 101, 105, 285/165, 298, 302, 308, 322, 323, 373, 419, 421, 348, 343, DIG. 21, 315, 342; 166/0.6, 212

[56] References Cited

UNITED STATES PATENTS

| | | | |
|---|---|---|---|
| 3,321,217 | 5/1967 | Ahlstone | 285/315 X |
| 2,137,853 | 11/1938 | Nixon | 285/145 X |
| 3,209,829 | 10/1965 | Haeber | 285/145 X |
| 1,455,731 | 5/1923 | Kelly | 285/146 X |
| 3,029,873 | 4/1962 | Hones | 166/212 |
| 3,142,500 | 7/1964 | Wesseler | 285/342 X |
| 3,298,699 | 1/1967 | Hall | 285/18 X |
| 3,333,870 | 8/1967 | Watkins | 285/315 X |
| 3,393,926 | 7/1968 | Arnold | 285/18 |
| 3,598,429 | 6/1971 | Arnold | 285/18 |

*Primary Examiner*—Dave W. Arola
*Attorney*—Paul E. Harris, Lee R. Larkin and Marcus L. Thompson

[57] ABSTRACT

A housing arranged for positioning over the end of a tubular member carries a tapered slip assembly arranged for actuation into gripping engagement with the tubular member. Longitudinally aligned cylinders are circumferentially spaced about within the housing and a piston slidably positioned in each cylinder is arranged to provide actuation force to the slip assembly in response to an hydraulic pressure.

7 Claims, 10 Drawing Figures

PATENTED NOV 28 1972
3,704,033
SHEET 1 OF 3
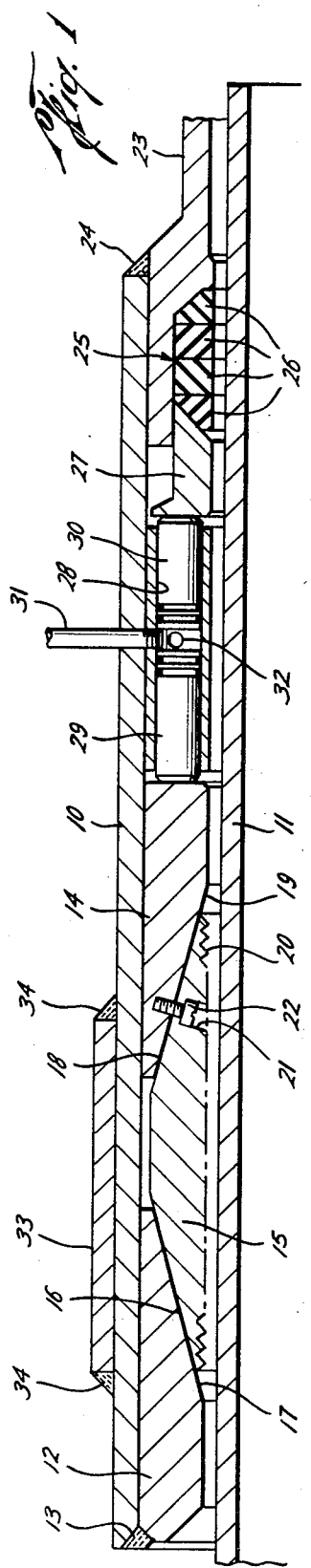
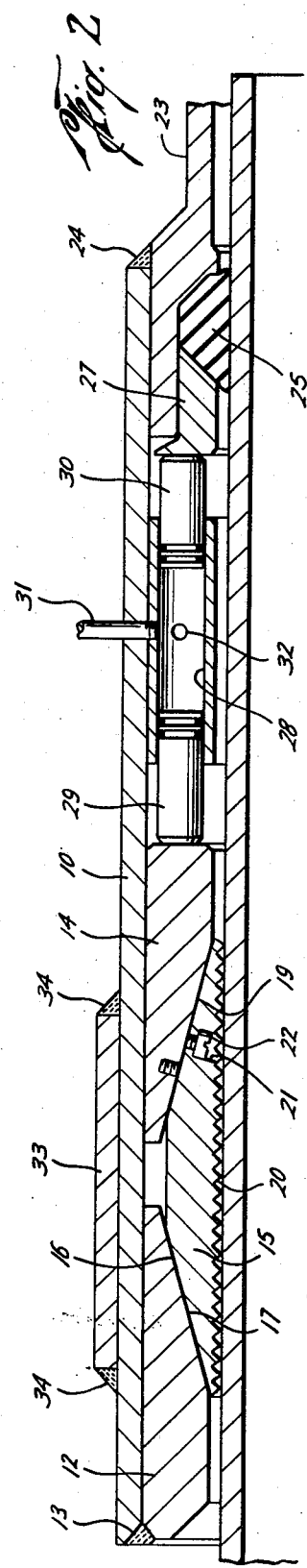
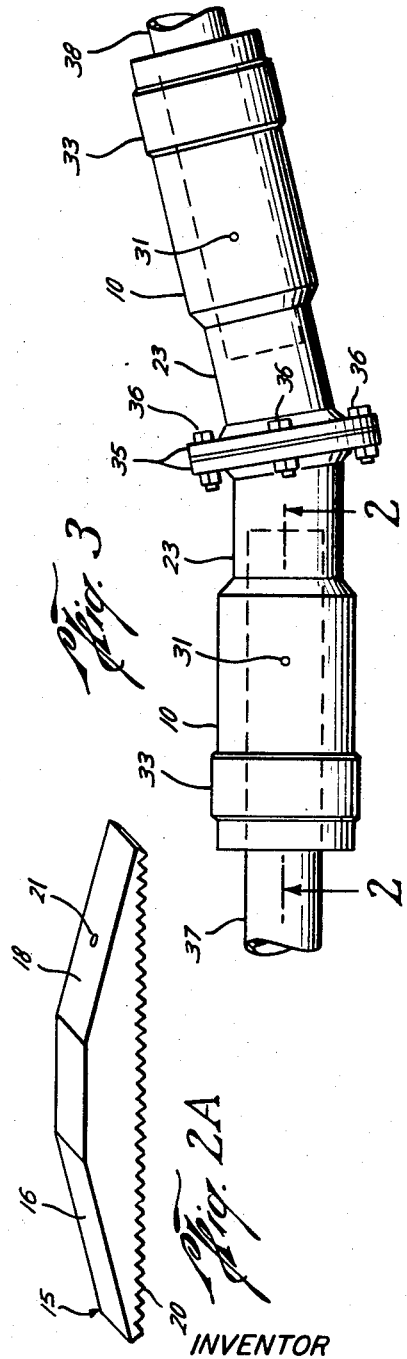
INVENTOR
James F. Arnold
BY Lee R. Larkin
ATTORNEY

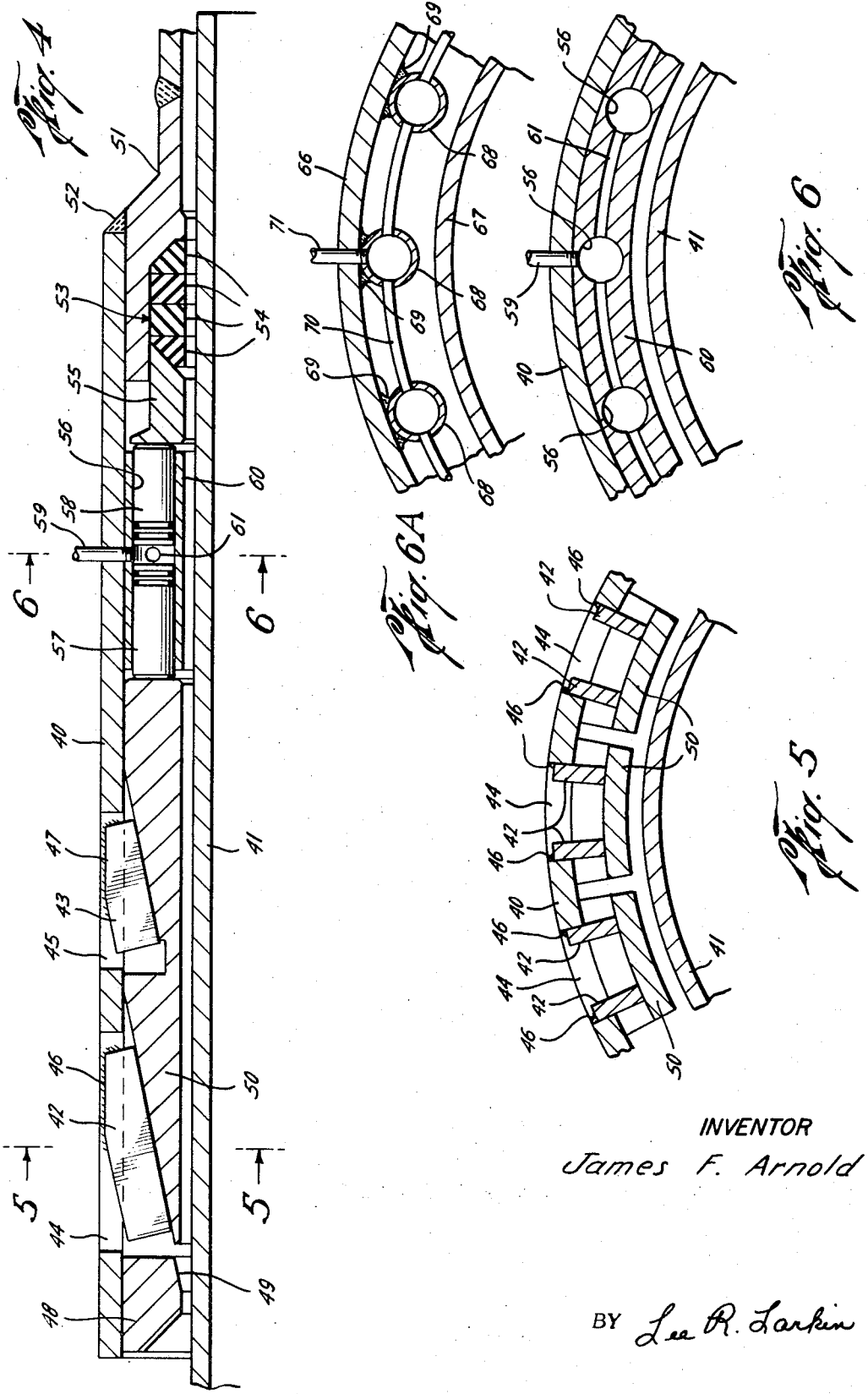

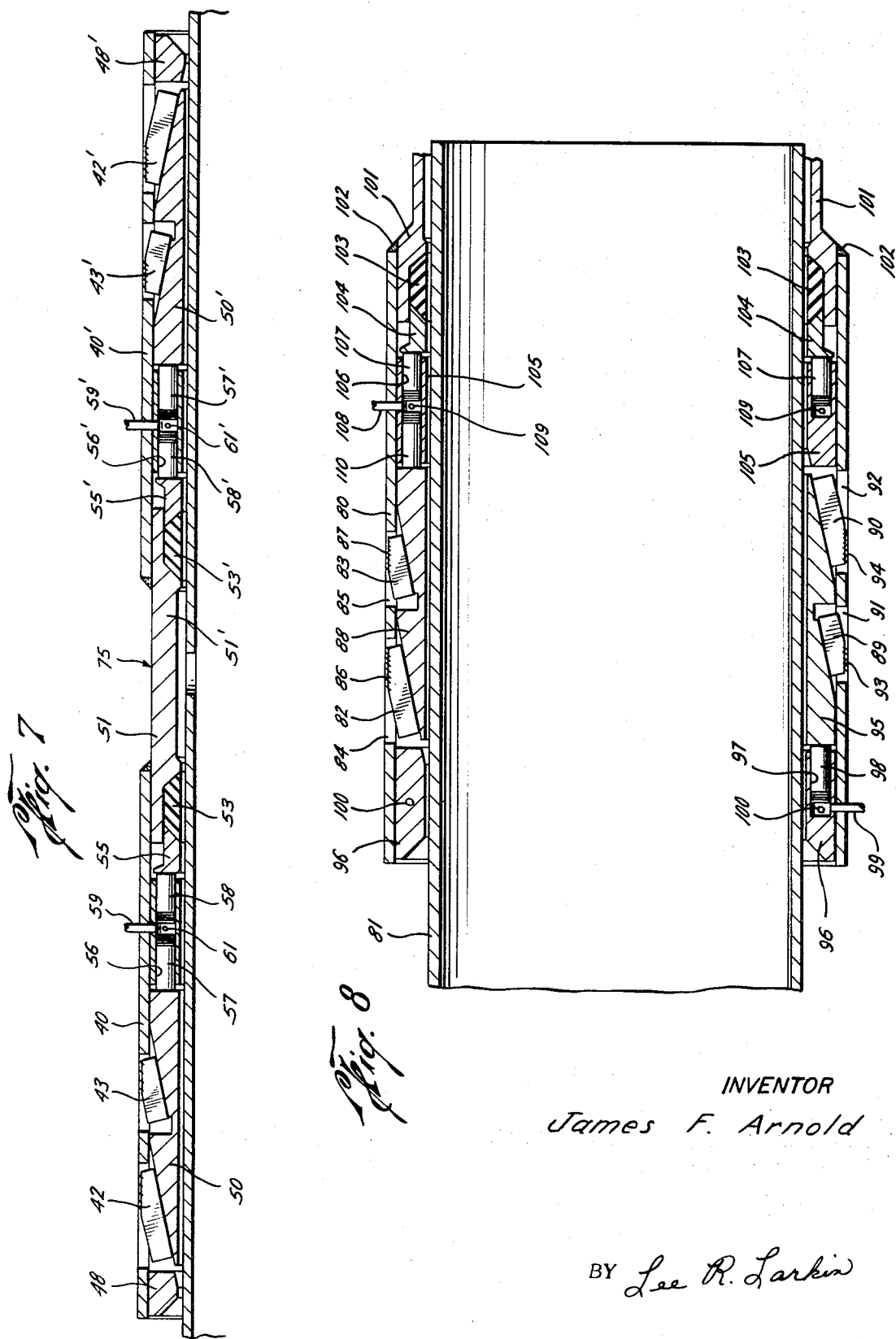

CONNECTOR FOR TUBULAR MEMBERS

BACKGROUND OF THE INVENTION a. Field of the Invention

Connector for tubular members having gripping means actuated by hydraulically driven discrete pistons.

b. Description of the Prior Art

In the construction and repair of pipelines and of drilling platforms or other structures formed of tubular members, conventional construction techniques are frequently unsuitable. For example, conventional welding techniques may be extremely hazardous or time consuming when used for underwater construction or when working around explosive material. Various mechanical connectors have been suggested for use in these environments; however, these connectors generally involve elaborate and time consuming mechanical installation techniques.

Hydraulically actuated pipe connectors, such as that illustrated in Arnold U. S. Pat. No. 3,393,926, have been suggested for use in these environments. All of the known prior art connectors 'f this type employ tapered slip gripping means for securing the coupling housing to a tubular member and derive an actuating force for the tapered slips from an annular piston slidably arranged within the housing. While this arrangement is suitable for use with smaller diameter connectors, the use of annular pistons in larger diameter connectors can become prohibitavely expensive due to the large amount of close tolerance machining required to construct the pistons and to prepare the interior of the housing.

In addition, prior art connectors are generally provided with only a single set of conventional tapered slips arranged to grip the outside surface of the tubular member. Therefore, prior art connectors of this general type will resist an axial force from only one direction and are subject to disconnection when subjected to axial force in the other direction.

SUMMARY OF THE INVENTION

It is therefore an object of this invention to provide an improved connector having gripping elements arranged to resist axial forces in both tension and compression, which gripping elements are actuated by hydraulically actuated discrete pistons.

One embodiment this invention includes a housing having one end arranged for positioning over the end of a tubular member, which housing carries means for gripping the tubular member upon actuation thereof. Provided within the housing are a plurality of longitudinally aligned cylinders which are circumferentially spaced about inside of the housing. A piston is slidably positioned in each of the cylinders and is arranged to provide an actuation force to the gripping means in response to an hydraulic pressure.

Seal means may be provided for forming a pressure tight seal between the housing and the tubular member upon actuation thereof. Some of the cylinders and pistons may be arranged to provide substantially simultaneous actuation forces to the gripping means and to the seal means. The piston cylinders may be formed in discrete tubular members which are individually secured within the housing or may be formed in one or more annular, generally cylindrical members which are rigidly secured within the housing.

Another embodiment of this invention similarly employs a housing with longitudinally aligned cylinders with pistons therein arranged to provide an actuation force to the gripping means. In this embodiment the gripping means is arranged to resist axial forces in tension and compression and includes a circumferential, inwardly facing tapered annular bowl formed within the housing. An outwardly facing tapered annular bowl is provided within the housing and is arranged for axially sliding movement toward the inwardly facing bowl, upon actuation. A segmented slip assembly is circumferentially positioned within the housing intermediate the bowls, and each slip segment has outwardly facing surfaces at each end which are arranged to matingly engage the bowls and to be formed radially inward by the bowls into engagement with the pipe.

In a third form of this invention the gripping means arranged to resist axial forces in tension and compression takes the form of circumferentially spaced alternately facing tapered bowl segments formed in a portion of the housing, with a tapered slip matingly and slidably positioned in each of the bowl segments and arranged for actuation into engagement with the tubular member.

BRIEF DESCRIPTION OF THE DRAWINGS

FIG. 1 is a partial side elevation view, partly in section, of one embodiment of this connector invention.

FIG. 2 is a view similar to FIG. 1 but showing the apparatus of FIG. 1 actuated into engagement with a tubular member therein.

FIG. 2A is an isometric view of one segment of the double tapered slip assembly shown in FIGS. 1 and 2.

FIG. 3 is a side view illustrating two of the connectors of this invention joined with bias flanges and used to couple together two misaligned pipes.

FIG. 4 is a partial side elevation view, partly in section, of a portion of a second embodiment of this connector invention.

FIG. 5 is a partial sectional view taken along 5 — 5 of FIG. 4.

FIG. 6 is a partial sectional view of the piston and cylinder assembly of FIG. 4 taken along 6 — 6 of FIG. 4.

FIG. 6A is a partial sectional view of an alternate piston and cylinder assembly which may be used in place of that shown in FIG. 6 and is taken along 6 — 6 of FIG. 4.

FIG. 7 is a partial side elevation view, partly in section, of a pipe coupling formed of two of the connector portions illustrated in FIG. 4.

FIG. 8 is a partial side elevation view, partly in section, of a portion of a third embodiment of this connector invention.

DESCRIPTION OF THE PREFERRED EMBODIMENT

Referring to the drawings and particularly to FIG. 1, a first embodiment of this connector invention presently preferred by the inventors includes a housing 10 arranged for positioning over the end of a tubular member such as pipe 11. The left end of housing 10, as viewed in FIG. 1, has a circumferential, annular, inwardly facing bowl 12 formed therein. Bowl 12 may be machined as an intregal part of housing 10 or may be formed in a separate member and rigidly connected to housing 10 as by weld 13.

Axially spaced from bowl 12 is a second annular tapered bowl 14 which faces outwardly toward bowl 12 and which is arranged for axially slidable movement within housing 10. Between bowls 12 and 14 is slidably positioned a double-tapered slip assembly formed of circumferentially spaced slip segments 15. As viewed in FIG. 2A, each slip segment 15 is an elongate member having the upper left surface 16 thereof tapered for mating engagement with inwardly facing surface 17 of bowl 12 and having the upper right surface 18 thereof tapered for mating engagement with outwardly facing surface 19 of slidable bowl 14. The lower surface of slip 15 is provided with serrations or wickers 20 arranged to engage and grip the outer surface of pipe 11. As viewed in FIG. 2A, the right end of slip 15 is provided with a counter bored screw clearance hole 21 therethrough. When slip segments 15 are arranged within housing 10, and before pipe 11 is inserted therein, a shear screw 22 is inserted through hole 21 into bowl 14 and acts to retain slips 15 in a longitudinally aligned, circumferentially spaced relation, ready for actuation.

The right end of housing 10, as viewed in FIG. 1, is provided with a tubular housing extension 23 which is connected to housing 10 by weld 24. A seal 25 in the form of a plurality of annular packer rings 26 is mounted within extension 23. Packer rings 26 are of a conventional design and are arranged to be deformed radially inward into sealing engagement with pipe 11 in response to an axially compressive force thereon. A packer compression ring 27 provided in housing 10 adjacent the left end of seal 25 is arranged to evenly transmit an axial actuation force to seal 25.

Contained in housing 10 between bowl 14 and ring 27 are a plurality of longitudinally aligned, circumferentially disposed cylinders 28, one of which is shown in section in FIG. 1. The circumferential, longitudinal arrangement of cylinders 28 and the structural details thereof are best understood by referring to FIGS. 4, 6 and 6A, and the accompanying description further below. A pair of pistons 29 and 30 are positioned in each of cylinders 28 and arranged for opposed axially slidable movement in response to the pressure of an hydraulic fluid which may be introduced into cylinders 28 through inlet line 31.

Referring to FIG. 2, the FIG. 1 coupling is shown actuated into engagement with pipe 11. In operation, housing 10 is slidably positioned over the end of pipe 11 and a pressurized hydraulic fluid is introduced into cylinders 28 through line 31. This fluid pressure is transmitted to the balance of cylinders 28 through manifold 32, best seen in FIGS. 6 and 6A and described below, and causes opposed axial movement of pistons 29 and 30. Rightward movement of piston 30, as viewed in FIGS. 1 and 2, causes rightward axially movement of ring 27, resulting in an axial compression and radially inward deformation of seal 25 into engagement with pipe 11. Leftward movement of piston 29 causes an axial actuation force to be exerted upon slidable tapered bowl 14 which in turn forces slips 15 leftward against bowl 12. When the force from pistons 29 is of sufficient magnitude, screws 22 will be sheared and bowl 14 will continue leftward, causing slips 15 to move radially inward into engagement with the outer surface of pipe 11, as shown in FIG. 2.

In some situations where high values of actuation force are to be applied to slips 15, housing 10 is provided with an outer, circumferential reinforcing collar 33 connected thereto by weld 34. Collar 33 adds rigidity to housing 10 and prevents housing 10 from deforming radially outward in response to the force transmitted by bowl 14.

The connector configuration described above may be used in a variety of situations involved in connection of tubular members. For example, referring to FIG. 3, two connectors similar to that above described are provided with bias cut flanges 35 suitably secured to housing extensions 23 and the flanges are connected together as by bolts 36, thereby allowing rigid connection of misaligned pipes 37 and 38.

Some of the differences and advantages offered by this embodiment over the prior art include the provision of less expensive and more easily manufactured discrete piston and cylinder actuation means and the provision of double tapered slips arranged, when actuated, to oppose axial forces on the connector in tension and compression.

A second embodiment of the connector apparatus of this invention is illustrated in partial cross-section in FIG. 4. As with the above described embodiment, the connector of FIG. 4 may be provided with a flange member on the right end (not shown) for connection to other such connectors, as shown in FIG. 3. Alternatively, two of the FIG. 4 type connectors may be rigidly joined together to form a pipe coupling such as that shown in FIG. 7.

Referring now to FIG. 4, the apparatus of this embodiment includes a housing 40 arranged for slidable positioning over the end of a tubular member such as pipe 41. The left end of housing 40, as viewed in FIG. 4, is provided with a double tapered inwardly facing circumferential bowl assembly formed of a plurality of parallel bowl segments 42 and 43. Segments 42 and 43 are discrete elements which are positioned in longitudinal slots 44 and 45, respectively, of housing 40 and are welded thereto by welds 46 and 47, respectively. The circumferential parallel arrangement of segments 42 and 43 and their relationship and connection to housing 40 is best seen in FIG. 5 which is an illustration of a partial sectional view taken through segments 42 shown in FIG. 4.

The extreme left end of housing 40, as viewed in FIG. 4, carries an annular bowl termination ring 48 having inwardly tapered portion 49 therein, which portion acts as a continuation of the tapered slip bowl formed by segments 42. Ring 48 also acts as an end termination for housing 40 and as a centering ring to aid in positioning housing 40 properly over the end of pipe 41. Slidably, matingly positioned within bowl segments 42 and 43 are a plurality of double tapered slips 50 which are arranged to move radially inward into gripping engagement with pipe 41 when subjected to a leftward axial force, as viewed in FIG. 4.

The right end of housing 40, as viewed in FIG. 4, is provided with a tubular housing extension 51 which is connected to housing 40 by weld 52. A seal 53 in the form of a plurality of annular packer rings 54 is positioned within extension 51 and arranged for radially inward deformation into sealing engagement with pipe 41 in response to an axially compressive force thereon. An annular compression ring 55 is slidably positioned adjacent the left end of seal 53 and is arranged to evenly transmit an axial actuation force thereto.

An actuation force for slips 50 and seal 53 is derived from a cylinder and piston assembly which is positioned therebetween. This assembly includes a plurality of longitudinally aligned circumferentially spaced cylinders 56 secured within housing 40, as described below. Pistons 57 and 58 are coaxially slidably positioned within each of cylinders 56 and are arranged for opposed axial movement in response to an hydraulic pressure introduced into cylinders 56 through pressure inlet line 59.

The advantages and differences over the prior art offered by the connector of this embodiment similarly include the provision of discrete piston and cylinder actuation means and additionally include provision of a double tapered bowl assembly which may be simply constructed with a minimum of machining time.

Two alternate embodiments of cylinders 56 are illustrated in FIGS. 6 and 6A. Either of these may be used with the apparatus of FIGS. 1 – 5 and 7, and when slightly modified, with the apparatus illustrated in FIG. 8, as described below.

Referring to FIG. 6, a partial housing segment 40 is illustrated coaxially surrounding pipe 41. Coaxially positioned therebetween and suitably secured to housing 40 is an annular tubular member which forms a cylindrical cylinder block 60. Axially aligned circumferentially spaced cylinders 56 are bored into block 60 and are interconnected by manifold 61. A pressure inlet line 59 communicates with one of cylinders 56 and provides means for introducing a pressurized hydraulic fluid thereinto.

Referring now to FIG. 6A, an alternate cylinder arrangement is illustrated which includes a similar partial housing segment 66 coaxially surrounding a pipe 67. In this embodiment a plurality of discrete tubular cylinders 68 are individually axially aligned and circumferentially welded within housing 66 by welds 69. Fluid manifold 70 communicates between cylinders 68 and a pressure inlet line 71 allows introduction of an actuation hydraulic fluid thereto.

As explained above, FIG. 7 illustrated the use of two of the FIG. 4 type connectors to form a pipe coupling generally designated 75. In FIG. 7 the elements of the left portion of coupling 75 are given the same designation numerals as in FIG. 4, while the mirror image elements in the right portion thereof are designated by the corresponding prime numerals. These corresponding elements include a housing 40' having bowl segments 42' and 43' therein, slips 50', cylinders 56' having pistons 57' and 58' therein actuated by a pressure from inlet line 59' and manifold 61', housing extension 51' having annular seal 53' therein, and slidable annular compression ring 55'.

Referring now to FIG. 8, a third embodiment of this invention is partially shown in section and includes a housing 80 which generally coaxially surrounds pipe 81. As viewed in FIG. 8, the generally central portion of housing 80 has double tapered slip and bowl assemblies formed therein which are similar to that shown above in FIGS. 4 and 5. In this embodiment, however, the slips and bowls are alternately oppositely facing and, when actuated, will oppose axial forces in tension and compression.

Referring to the upper portion of FIG. 8, a rightwardly facing bowl assembly is illustrated which is formed of bowl segments 82 and 83 which are secured within slots 84 and 85 respectively, in housing 80 by welds 86 and 87, respectively. Slidably, matingly positioned within segments 82 and 83 is a double tapered slip 88 arranged for leftward actuation into gripping engagement with pipe 81.

In the lower portion of FIG. 8 a leftwardly facing bowl assembly is illustrated which is formed of bowl segments 89 and 90 secured within housing slots 91 and 92 by welds 93 and 94. A double tapered slip 95 is slidably matingly positioned within segments 89 and 90 and is arranged for rightward actuation into gripping engagement with pipe 81.

Although only two bowl and slip assemblies are illustrated in FIG. 8, it is to be understood that a larger number of these assemblies may be used to produce a greater gripping engagement with pipe 81, as required. Regardless of the number used, it is preferable to face circumferentially adjacent assemblies in opposite axial directions so that the gripping forces thereof will be distributed evenly about pipe 81.

The left end of housing 80, as viewed in FIG. 8, carries an annular bowl termination ring 96. Within ring 96 are bored cylinders 97, with one cylinder being aligned with each of the rightwardly facing slips 95. A piston 98 is coaxially positioned in each of cylinders 97 and is arranged for axially rightward movement in response to an hydraulic pressure introduced from pressure inlet line 99. A manifold 100 communicates with each of cylinders 97 and distributes the pressure from line 99 thereto.

The right end of housing 80, as viewed in FIG. 8, is provided with a tubular housing extension 101 which is connected to housing 80 by weld 102. A seal 103 is annularly positioned within extension 101 and is arranged for radially inward deformation into sealing engagement with pipe 81 in response to an axial force thereon. An annular seal compression ring 104 is slidably positioned adjacent the left end of seal 103 and is arranged to evenly transmit an axial actuation force thereto. Actuation force for seal 103 is derived from a cylinder and discrete piston assembly which is positioned therebetween. In the illustrated embodiment, a generally tubular piston block 105 is secured within housing 80 and has a plurality of first circumferentially spaced cylinders 106 bored therein and facing rightward, as viewed in FIG. 8. Equally suitable would be the use of discrete tubular cylinders such as those shown in FIG. 6A and described above. Seal actuation pistons 107 are coaxially provided in each of cylinders 106 and are arranged for rightward axial movement to transmit an actuation force to ring 104 in response to an hydraulic pressure applied thereto through inlet line 108. A manifold 109 communicates the pressure from line 108 to each of cylinders 106.

The actuation force for leftwardly facing slips 88 is similarly derived from an hydraulically actuated cylinder and discrete piston assembly. Here the cylinders 106 which are longitudinally aligned with each of slips 88 are extended leftward, as viewed in FIG. 8, and a coaxial slidable position 110 is positioned therein and arranged to transmit an axial actuation force to slips 88.

In addition to the provision of discrete piston and cylinder actuation, the advantages over the prior art offered by this connector embodiment further include a novel alternately facing slip assembly arranged for opposing axial forces which is mechanically compact and structurally relatively inexpensive to construct.

In operation housing 80 is slidably positioned over the end of pipe 81 and a pressurized hydraulic fluid is introduced through lines 99 and 108 into cylinders 97 and 106, respectively. Rightward movement of pistons 107 will transmit an axial actuation force to seal 103. Rightward movement of pistons 98 and leftward movement of piston 110 will cause slips 95 and 88, respectively, to grippingly engage pipe 81.

Any convenient source of pressurized hydraulic fluid may be used to actuate the apparatus of FIGS. 1 – 8, above described. However, if a permanent connection is planned, a hardenable fluid such as epoxy resin is preferred so that a permanent, non-yielding pressure will be exerted on the slips and seal.

Further modifications and alternative embodiments of the invention will be apparent to those skilled in the art in view of this description. Accordingly, this description is to be construed as illustrative only and is for the purpose of teaching those skilled in the art the manner of carrying out the invention. It is to be understood that the forms of the invention herewith shown and described are to be taken as the presently preferred embodiments. Various changes may be made in the shape, size and arrangement of parts. For example, equivalent elements or materials may be substituted for those illustrated and described herein, parts may be reversed, and certain features of the invention may be utilized independently of the use of other features, all as would be apparent to one skilled in the art after having the benefit of this description of the invention.

What is claimed is:

1. In an underwater connector for pipe, the combination comprising:
   a housing arranged for slidable positioning over the end of a pipe to which connection is to be made;
   said housing having a first annular bowl formed therein, said first bowl having a tapered surface facing generally in a first axial direction;
   a second annular bowl positioned within said housing and arranged for axially sliding movement toward said first bowl upon actuation thereof, said second bowl having a tapered surface facing generally in the opposite axial direction toward said first bowl;
   a slip assembly slidably positioned in said housing intermediate said bowls, said slip assembly having segments which are longitudinally aligned, and each of said segments having outwardly facing surfaces at each end thereof arranged to matingly engage the tapered surfaces of said bowls, and said segments each having a gripping surface on the radially inward side thereof arranged to engage said pipe when said segments are cammed inwardly by the tapered surfaces of said bowls; and
   means for moving said slidable second bowl toward said first bowl to thereby cam said slip segments radially inward into engagement with said pipe, whereby said slip segments each resist axial forces in tension and compression that may be exerted on said connection, said moving means including a plurality of hydraulically actuated pistons longitudinally aligned and circumferentially spaced about in said housing and arranged to provide a movement force to said slidable second bowl upon actuation thereof.

2. The invention as claimed in claim 1 wherein:
   each of said pistons is mounted in a discrete tubular member which is individually rigidly secured within said housing; and
   including means for injecting a hydraulic pressure into each of said discrete tubular members to actuate said piston mounted therein.

3. The invention as claimed in claim 1 wherein:
   said pistons are mounted in cylinders formed in an annular, generally cylindrical member rigidly secured within said housing.

4. In an underwater pipe connector, the combination comprising:
   a housing arranged for slidable positioning over the end of a pipe to which connection is to be made;
   a portion of said housing having formed therein circumferentially spaced tapered bowl segments, with each of said bowl segments having a tapered surface facing in an axial direction, with alternate ones of said tapered surfaces facing in opposite axial directions;
   a tapered slip matingly, slidably positioned adjacent each of said bowl segments, said slips being arranged for actuation radially inward into engagement with said pipe upon contact by the tapered surface of the adjacent bowl segment;
   said housing having a plurality of longitudinally aligned and circumferentially spaced about cylinders therein with one of said cylinders being adjacent one end of each of said slips; and
   a piston slidably positioned within each of said cylinders and arranged to provide actuation forces to move said slips axially into camming engagement with said bowl segments and gripping engagement with said pipe in response to a hydraulic pressure.

5. In an underwater connector for pipes, the combination comprising:
   a housing arranged for slidably positioning over the pipe to which connection is to be made;
   a plurality of slips mounted in said housing at circumferentially spaced about positions therein, each of said slips having at least two axially spaced apart tapered surfaces on the radially outward side thereof and a gripping surface on the radially inward side;
   means in said housing for providing a mating camming surface for each of said tapered surfaces of said slips for camming said slips radially inward into engagement with said pipe upon actuation of said slips;
   a plurality of hydraulically actuated pistons longitudinally aligned and circumferentially spaced about in said housing, each of said pistons being arranged to move in an axial direction upon application of hydraulic pressure thereto; and
   means in said housing responsive to the axial movement of said pistons for bringing the tapered surfaces of said slips into camming contact with the mating camming surfaces in said housing, whereby said slips are cammed radially inward into gripping engagement with said pipe.

6. The invention as claimed in claim 5 including:

an annular resilient seal mounted in said housing, said seal being deformable radially inward into sealing engagement with said pipe in response to axial pressure applied thereto.

7. In an underwater connector for pipes, the combination comprising:

a housing arranged for slidably positioning over the pipe to which connection is to be made;

a plurality of slips mounted in said housing at circumferentially spaced about positions therein, each of said slips having at least one tapered surface on the radially outward side thereof and a gripping surface on the radially inward side;

means in said housing for providing a mating camming surface for each tapered surface of said slips for camming said slips radially inward into engagement with said pipe upon actuation of said slips;

said housing also being provided with a plurality of longitudinally aligned and circumferentially spaced about piston cylinders in said housing;

a pair of co-axially aligned hydraulically actuated pistons mounted in each of said cylinders, with each of said pistons being arranged to move in an axial direction in response to hydraulically actuated force applied thereto;

an annular resilient seal mounted in said housing, said seal being deformable radially inwardly into sealing engagement with said pipe in response to axial force applied thereto; and means in said housing responsive to axial movement of said pistons for actuating said slips to the gripping position and said seal to the sealing position.

* * * * *